United States Patent
Li et al.

(10) Patent No.: US 11,736,795 B2
(45) Date of Patent: Aug. 22, 2023

(54) SHOOTING METHOD, APPARATUS, AND ELECTRONIC DEVICE

(71) Applicant: BAIDU ONLINE NETWORK TECHNOLOGY (BEIJING) CO., LTD., Beijing (CN)

(72) Inventors: Longchun Li, Beijing (CN); Weiguo Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 70 days.

(21) Appl. No.: 17/420,207

(22) PCT Filed: Dec. 3, 2020

(86) PCT No.: PCT/CN2020/133675
§ 371 (c)(1),
(2) Date: Jul. 1, 2021

(87) PCT Pub. No.: WO2022/000992
PCT Pub. Date: Jan. 6, 2022

(65) Prior Publication Data
US 2022/0321798 A1    Oct. 6, 2022

(30) Foreign Application Priority Data
Jun. 28, 2020 (CN) .......................... 202010598649.3

(51) Int. Cl.
*H04N 23/63* (2023.01)
*H04N 23/60* (2023.01)

(52) U.S. Cl.
CPC ......... *H04N 23/635* (2023.01); *H04N 23/632* (2023.01); *H04N 23/634* (2023.01); *H04N 23/64* (2023.01)

(58) Field of Classification Search
CPC ......... H04N 5/232945; H04N 5/23222; H04N 5/232935; H04N 5/232941;
(Continued)

(56) References Cited

U.S. PATENT DOCUMENTS

2012/0182447 A1* 7/2012 Gabay ............... H04N 5/23222
348/222.1
2017/0285764 A1* 10/2017 Kim .................. H04M 1/72403

FOREIGN PATENT DOCUMENTS

JP    H10210486 A    8/1998
JP    2002040321 A    2/2002
(Continued)

OTHER PUBLICATIONS

Office Action for Japanese Application No. 2021-536722, dated Oct. 4, 2022, 9 pages.
(Continued)

*Primary Examiner* — Yogesh K Aggarwal
(74) *Attorney, Agent, or Firm* — Lippes Mathias LLP

(57) ABSTRACT

A shooting method includes: obtaining a preview image collected by an image collection device; detecting a first relative distance and a first relative angle between a foreground of the preview image and the image collection device, and detecting a second relative distance and a second relative angle between a background of the preview image and the image collection device; determining a target shooting position of the image collection device based on the first relative distance, the first relative angle, the second relative distance and the second relative angle, wherein a picture obtained by shooting the foreground and the background at the target shooting position has a composition that matches with a set composition strategy; and displaying a prompt
(Continued)

message about the target shooting position for prompting the image collection device to move to the target shooting position.

18 Claims, 5 Drawing Sheets

(58) Field of Classification Search
CPC ......... H04N 5/232939; H04N 5/23258; H04N 5/23251; H04N 5/23267; H04N 5/232933
See application file for complete search history.

(56) References Cited

FOREIGN PATENT DOCUMENTS

| JP | 2005099164 A | 4/2005 |
|----|--------------|--------|
| JP | 2012244249 A | 12/2012 |
| JP | 2013070303 A | 4/2013 |
| JP | 2017069911 A | 4/2017 |
| KR | 21040122344 A | 10/2014 |
| WO | 2011108283 A1 | 9/2011 |
| WO | 2019082539 A1 | 5/2019 |

OTHER PUBLICATIONS

Office Action for Korean Application No. 10-2021-7027007, dated Apr. 7, 2023, 2021, 11 pages.
Notice of Allowance for Japanese Application No. 2021-536722, dated May 9, 2023, 5 pages.

\* cited by examiner

SHOOTING METHOD, APPARATUS, AND ELECTRONIC DEVICE

CROSS-REFERENCE OF RELATED APPLICATION

The present application is the U.S. national phase application of International Application No. PCT/CN2020/133675 filed on Dec. 3, 2020, which claims priority Chinese patent application which are incorporated herein by reference.

TECHNICAL FIELD

The disclosure relates to a field of image processing, specifically to the field of computer vision, artificial intelligence, and deep learning technologies, and particularly to a shooting method, a shooting apparatus, and an electronic device.

BACKGROUND

With the popularization of electronic devices, more and more users like to use the camera function of electronic devices to take pictures or record their lives. However, if the user wants to take a high-quality picture, various factors such as the shooting angle and light need to be taken into consideration, which is more difficult for ordinary users to operate.

In the related art, the user takes a plurality of pictures and selects a perfect picture from them. Alternatively, the user may get the perfect picture through post-image processing.

SUMMARY

According to a first aspect of the disclosure, a shooting method includes: obtaining a preview image collected by an image collection device; detecting a first relative distance and a first relative angle between a foreground of the preview image and the image collection device, and detecting a second relative distance and a second relative angle between a background of the preview image and the image collection device; determining a target shooting position of the image collection device based on the first relative distance, the first relative angle, the second relative distance and the second relative angle, wherein a picture obtained by shooting the foreground and the background at the target shooting position has a composition that matches with a set composition strategy; and displaying a prompt message about the target shooting position for prompting the image collection device to move to the target shooting position.

According to a second aspect of the disclosure, a shooting apparatus includes one or more processors and a memory storing instructions executable by the one or more processors. The one or more processors are configured to obtain a preview image collected by an image collection device; detect a first relative distance and a first relative angle between a foreground of the preview image and the image collection device, and detect a second relative distance and a second relative angle between a background of the preview image and the image collection device; determine a target shooting position of the image collection device based on the first relative distance, the first relative angle, the second relative distance and the second relative angle, wherein a picture obtained by shooting the foreground and the background at the target shooting position has a composition that matches with a set composition strategy; display a prompt message about the target shooting position for prompting the image collection device to move to the target shooting position.

According to a third aspect of the disclosure, an electronic device includes a first camera, a second camera, a sensor, a pressure element and a processor. The first camera may be configured to collect a preview image and the second camera may be configured to synchronously collect a depth map of the preview image. The sensor may be configured to periodically collect attitude information of the first camera. The pressure element may be configured to collect a pressing force of a shooting control in a shooting interface. The processor may be configured to determine a first relative distance and a first relative angle between a foreground of the preview image and the first camera, and a second relative distance and a second relative angle between a background of the preview image and the first camera based on the depth map of the preview image; determine a target shooting position of the image collection device based on the first relative distance, the first relative angle, the second relative distance and the second relative angle, wherein a picture obtained by shooting the foreground and the background at the target shooting position has a composition that matches with a set composition strategy; and generate a prompt message about the target shooting position for prompting the image collection device to move to the target shooting position.

It may be understood that the content in this part is not intended to identify key or important features of the embodiments of the disclosure, and does not limit the scope of the disclosure. Other features of the disclosure will be easily understood through the following specification.

BRIEF DESCRIPTION OF THE DRAWINGS

The drawings herein are used to better understand the solution, and do not constitute the limitation on the disclosure.

DETAILED DESCRIPTION

The following describes exemplary embodiments of the disclosure with reference to the accompanying drawings, which include various details of the embodiments of the disclosure to facilitate understanding, and they should be considered as merely exemplary. Therefore, those skilled in the art should realize that various changes and modifications may be made to the embodiments described herein without departing from the scope and spirit of the disclosure. Similarly, for clarity and conciseness, descriptions of well-known functions and structures are omitted in the following description.

A shooting method, a shooting apparatus, an electronic device, and a storage medium of the disclosure may automatically calculate and prompt the optimal shooting position (i.e., the target shooting position herein) for the user in taking a picture, which solves the problem in the related art that it is necessary to take a long time to shoot a plurality of pictures for subsequent selection of the perfect picture with poor user experiences or it is necessary to take more time and efforts for post-image processing to obtain the perfect picture.

A shooting method, a shooting apparatus, an electronic device, and a storage medium of the embodiments of the disclosure are described below with reference to the accompanying drawings.

Figure 1:
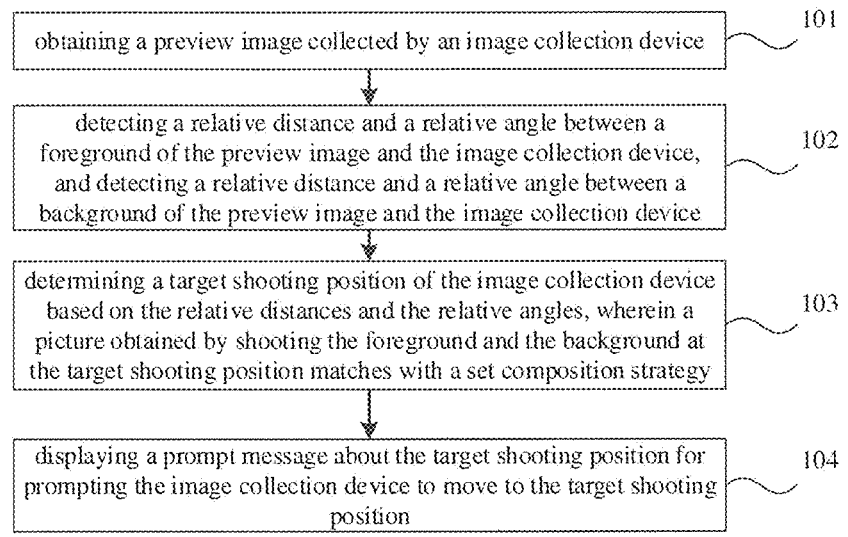
FIG. 1 is a flow chart illustrating a shooting method according to the first embodiment of the disclosure.

FIG. 1 is a flow chart illustrating a shooting method according to the first embodiment of the disclosure.

In the embodiments of the disclosure, the shooting method configured in a shooting apparatus is taken as an example. The shooting apparatus can be applied to any electronic device, so that the electronic device can perform the shooting function.

The electronic device can be any device with a computing power, such as a personal computer (PC), a mobile terminal, a server, and the like. The mobile terminal can be, for example, a mobile phone, a tablet computer, a personal digital assistant, a wearable device, an on-board equipment or other hardware devices with various operating systems, touch screens and/or display screens.

As illustrated in FIG. 1, the method may include the following blocks.

In block 101, a preview image collected by an image collection device is obtained.

In the embodiments of the disclosure the image collection device is a device that can perform the image collection, for example, it can be a charge coupled device (CCD), a complementary metal oxide semiconductor (CMOS), a thin film transistor (TFT) and other image collection devices, or, it can be: a mobile terminal such as a mobile phone, a tablet computer, or a wearable device.

In the embodiments of the disclosure, a camera may be provided on the image collection device, and the preview image is collected by the camera. For example, the image collection device may be provided with a visible light camera, such as a red green blue (RGB) camera, through which a preview image is collected.

The number of camera is not limited, for example, there can be one camera or a plurality of cameras. Moreover, the way is not limited in which the camera is provided in the electronic device. For example, there can be a camera built into the electronic device, or there can be a camera external to the electronic device. For another example, there can be a front camera or a rear camera. The camera may be any type of camera. For example, the camera may be a color camera, a black and white camera, a telephoto camera, a wide-angle camera, and the like, which is not limited here.

When the electronic device is provided with a plurality of cameras, the plurality of cameras may be the same type of cameras, or may be different types of cameras, which is not limited in the disclosure. For example, all the cameras may be the color cameras, or black and white cameras, or one of the cameras may be a telephoto camera, and the other camera may be a wide-angle camera, and the like.

In block 102, a first relative distance and a first relative angle between a foreground of the preview image and the image collection device, and a second relative distance and a second relative angle between a background of the preview image and the image collection device are detected.

As a possible implementation of the embodiments of the disclosure, the image collection device may also include cameras capable of collecting depth information, such as a time of flight (TOF) camera, a structured light camera, and an RGB-D (Depth) camera and other depth cameras. When the visible light camera is controlled to collect a preview image, the depth camera can be controlled to synchronously collect the depth map, in which the depth map is used to indicate the depth information corresponding to each pixel in the preview image, so that the foreground and background of the preview image can be determined based on the depth map. In general, the depth information indicates that the shooting object is close to the plane where the camera is located. When the depth value is small, it can be determined that the object belongs to the foreground, otherwise, the object belongs to the background. Furthermore, the foreground and background of the preview image can be determined based on the depth information of each object in the depth map.

As another possible implementation of the embodiments of the disclosure, the image collection device may include a main camera and a sub-camera. The preview image is collected by one of the main camera and the sub-camera, and the test image is collected by the other of the main camera and the sub-camera, so that the depth information of the preview image can be determined based on the test image and the preview image, and the foreground and background can be determined based on the depth information of the preview image.

Specifically, since there is a certain distance between the main camera and the sub-camera, the two cameras have a parallax. The pictures taken by different cameras should be different. According to the triangulation ranging principle, the depth information of the same object in the preview image and the test image can be calculated. That is, the distance between the object and the plane where the main camera is located, and the distance between the object and the plane where the sub-camera is located can be calculated. After the depth information of the preview image is calculated, whether the object belongs to a foreground or a background is determined based on the depth information of each object in the preview image, and then the foreground and background of the preview image can be obtained.

In the embodiments of the disclosure, after the foreground and the background of the preview image are determined, a first relative distance and a first relative angle between the foreground and the image collection device, and a second relative distance and a second relative angle between the background and the image collection device can be detected. For example, the first relative distance and relative angle between the foreground and the image collection device can be determined based on the coordinates and depth information corresponding to each pixel in the foreground.

As an example, a central pixel in the foreground can be determined based on the coordinates corresponding to each pixel in the foreground, and the first relative distance and first relative angle between the foreground and the image collection device can be determined based on the coordinates and depth information corresponding to the central pixel. Similarly, a central pixel in the background can be determined based on the coordinates corresponding to each pixel in the background, and the second relative distance and second relative angle between the background and the image collection device can be determined based on the coordinates and depth information corresponding to the central pixel.

As another example, the first relative distance and first relative angle between each pixel in the foreground and the image collection device can be respectively calculated based on the coordinates and depth information corresponding to each pixel in the foreground. The average value of the first relative distances between respective pixels in the foreground and the image collection device is regarded as the first relative distance between the foreground and the image collection device, and the average value of the first relative angles between respective pixels in the foreground and the image collection device is regarded as the first relative angle between the foreground and the image collection device. Similarly, the average value of the second relative distances between respective pixels in the background and the image collection device is regarded as the second relative distance between the background and the image collection device, and the average value of the second relative angles between respective pixels in the background and the image collection device is regarded as the second relative angle between the background and the image collection device.

As another example, the first relative distances between all pixels in the foreground and the image collection device can be regarded as the first relative distance between the foreground and the image collection device. That is, the first relative distance between the foreground and the image collection device includes the distances between all the pixels and the image collection device. The first relative angles between all pixels in the foreground and the image collection device are regarded as the first relative angle between the foreground and the image collection device. Similarly, the second relative distances between all pixels in the background and the image collection device can be regarded as the second relative distance between the background and the image collection device, and the second relative angles between all pixels in the background and the image collection device are regarded as the second relative angle between the background and the image collection device.

In block 103, a target shooting position of the image collection device is determined based on the first relative distance, the first relative angle, the second relative distance and the second relative angle, in which a picture obtained by shooting the foreground and the background at the target shooting position has a composition that matches with a set composition strategy.

In the embodiments of the disclosure, the set composition strategy may include a composition of a relative position of the foreground to the background, a relative area of the foreground to the background, and the like. The set composition strategy is related to the current shooting scene. When the shooting scene is different, the set composition strategy can be different.

For example, the current shooting scene is a landscape scene. In order to get a high-quality landscape, the foreground can be smaller and the background can be larger. Therefore, the set composition strategy may include: the relative area of the foreground is smaller than the relative area of the background. For another example, the current shooting scene is a character scene or a group photo scene. In order to obtain a high-quality group photo, the foreground can be larger and the background can be smaller. Therefore, the set composition strategy may include: the relative area of the foreground is larger than the relative area of the background.

It should be noted that the above examples are exemplary, and do not constitute the limitation on the disclosure. In actual use, the set composition strategy can be preset according to actual needs and shooting scenes.

In the embodiments of the disclosure, a corresponding relationship between the shooting scene and the set composition strategy can be preset. Therefore, in the disclosure, the current shooting scene can be determined, and the corresponding set composition strategy can be determined by querying the corresponding relationship based on the current shooting scene, which is simple to operate, and easy to realize.

As a possible implementation of the embodiments of the disclosure, the current shooting scene may be manually selected by the user, and the set composition strategy may be determined based oil the current shooting scene selected by the user. For example, the shooting interface may be provided with a corresponding scene selection control, and the user can trigger the corresponding scene selection control based on his/her own shooting requirements to determine the current shooting scene.

As another possible implementation of the embodiments of the disclosure, the current shooting scene can also be automatically recognized by the shooting apparatus, and the set composition strategy can be determined based on the current shooting scene obtained by recognition. Specifically, the shooting apparatus may determine the current shooting scene based on the picture content of the preview image.

As an example, it can be determined whether the current shooting scene is a portrait scene based on the picture content of the preview image. For example, it can be detected whether there are at least two faces in the picture content of the preview image based on the face recognition technology. When there are at least two faces, it can be determined that the current shooting scene is the portrait scene. Alternatively, each imaging object in the preview image can be extracted based on the edge feature detection technology, so that it can be determined whether the current shooting scene is a portrait scene based on each imaging object. For example, when it is determined that there are at least two people based on the extracted imaging objects, it can be determined that the current shooting scene is the portrait scene.

As another example, it can be determined whether the current shooting scene is a night scene based on the picture content of the preview image and/or an ambient brightness value of each area of the preview image. For example, when the picture content of the preview image includes the night sky or light sources in the night scene, and the like, it can be determined that the current shooting scene is the night scene. Alternatively, when the ambient brightness value in each area of the preview image conforms to brightness distribution characteristics of the picture in the night environment, it can be determined that the current shooting scene is the night scene.

As another example, it can be determined whether the current shooting scene is a landscape scene based on the picture content of the preview image. For example, when the picture content of the preview image includes scenic spots, flowers, birds, trees, and the like it can be determined that the current shooting scene is the landscape scene.

In order to improve the accuracy of the recognition result, in the disclosure, the current shooting scene can also be recognized through deep learning technology. For example, based on the feature extraction algorithm, image features of the preview image can be extracted and input to a scene recognition model established in advance to identify the current shooting scene.

The image features may include at least one of a color feature, a texture feature, a shape feature, and a spatial relation feature. Feature extraction is a concept in the computer vision and image processing. It indicates that a computer is used to extract image information and it is determined whether a point in each image belongs to an image feature. The result of feature extraction is to divide the points in the image into different subsets, which often belong to isolated points, continuous curves or continuous areas.

In the embodiments of the disclosure, after the first relative distance and the first relative angle between the foreground and the image collection device, and the second relative distance and the second relative angle between the background and the image collection device can be determined, a 3D modeling can be performed based on the first relative distance and the first relative angle between the foreground and the image collection device, and the second relative distance and the second relative angle between the background and the image collection device, so as to determine the position of the foreground and the background in a three-dimensional coordinate system where the image collection device is located, and then simulation analysis is performed on the established 3D model so as to determine the optimal shooting position, which is denoted as the target shooting position in the disclosure. The picture obtained by shooting the foreground and the background at the target shooting position matches with the set composition strategy.

It should be noted that in the embodiments of the disclosure, the set composition strategy is related to the shooting scene. When the shooting scene is different, the set composition strategy can be different, thereby meeting the user's needs for obtaining high-quality pictures in different scenes.

In block 104, a prompt message about the target shooting position is displayed for prompting the image collection device to move to the target shooting position.

In the embodiments of the disclosure, the prompt message may be at least one of a text message, a direction arrow, and a rotation angle.

In the embodiments of the disclosure, after the target shooting position is determined, prompt message of the target shooting position can be displayed, so that the user can move the image collection device to the target shooting position based on the prompt message. For example, a moving direction and a moving distance can be determined based on the current position of the image collection device and the target shooting position, so that the prompt message can be generated based on the moving direction and the moving distance, and the above prompt message can be displayed for prompting the image collection device to move to the target shooting position.

For example, when the prompt message is a text message, the prompt message of the target shooting position can be displayed on the shooting interface, so that the user can move the image collection device to the target shooting position for taking a picture. For example, when the user is shooting a landscape picture, "Go forward 1 meter" can be displayed on the shooting interface.

It may be understood that the target shooting position is a point in the three-dimensional space. When the coordinate information of the target shooting position is directly displayed on the shooting interface, the user may not know where the point is. Therefore, in the disclosure, in order to facilitate users' operation, the prompt message can also include a direction arrow and/or rotation angle, so that the user can rotate the image collection device or move the image collection device to the target shooting position based on the direction arrow and/or the rotation angle. Therefore, through simple and clear prompt messages, it can be convenient for users to make corresponding actions, and the riser experience can be improved.

The prompt message can also be a voice message, and the prompt message can be played through a speaker. For example, when the user is shooting a landscape picture, "Go forward 1 meter" can be prompted in a voice through the speaker. Therefore, on the basis of not affecting the user to view the shooting picture on the screen of the image collection device, it can be also convenient for the user to make corresponding actions, and the user experience can be improved. In the disclosure, prompt messages can be displayed in various ways to improve the applicability of the method.

According to the shooting method in the embodiments of the disclosure, the foreground and background of the preview image collected by the image collection device are recognized, the first relative distance and the first relative angle between the foreground of the preview image and the image collection device, and the second relative distance and the second relative angle between the background of the preview image and the image collection device are detected, so that the target shooting position of the image collection device is determined based on the first relative distance, the first relative angle, second relative distance and the second relative angle, in which the picture obtained by shooting the foreground and background at the target shooting position matches with the set composition strategy, and the prompt message of the target shooting position is displayed for prompting the image collection device to move to the target shooting position. Therefore, when the user takes a picture, the optimal shooting position can be automatically calculated for the user; which is recorded as the target shooting position in the disclosure, and the target shooting position is prompted, so that the user can move the image collection device to the target shooting position based on the prompt message for taking pictures. On the one hand, the imaging effect can be improved. On the other hand, there is no need for the user to repeatedly shoot and filter pictures, and there is no need for the user to post-process pictures, which may improve the user experience.

Figure 2:
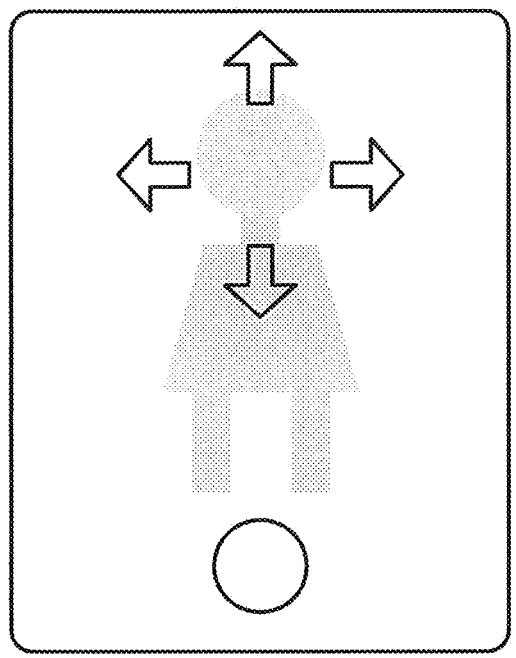
FIG. 2 is a first schematic diagram illustrating a shooting interface according to an exemplary embodiment.

As an example, FIG. 2 illustrates a schematic diagram of a shooting interface, in which the direction arrow can be displayed on the shooting interface, and the user can move the image collection device to the target shooting position based on the displayed direction arrow. For example, the user can move the image collection device forward to the target shooting position.

Figure 3:
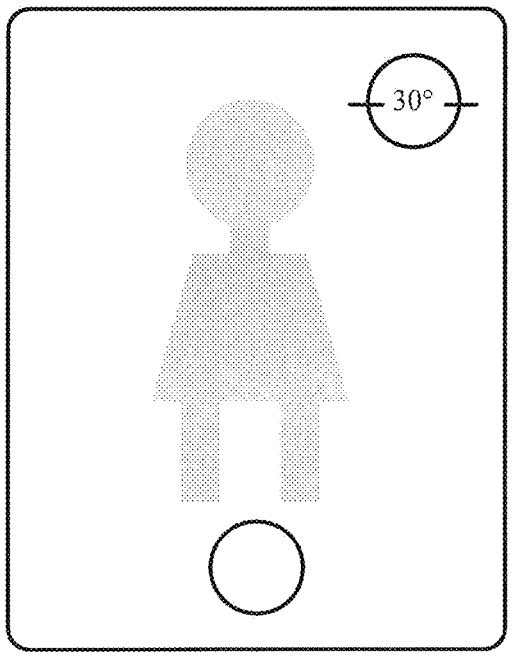
FIG. 3 is a second schematic diagram illustrating a shooting interface according to an exemplary embodiment.

As another example, FIG. 3 illustrates another schematic diagram of a shooting interface, in which the rotation angle can be displayed on the shooting interface, and the user can move the image collection device to the target shooting position based on the displayed rotation angle. For example, the user can hold the image collection device and rotate 30 degrees to the right for taking a picture.

As a possible implementation, in order to improve the accuracy of the determination result of the target shooting position, after 3D modeling is performed based on the first relative distance and the first relative angle between the foreground and the image collection device, and the second relative distance and the second relative angle between the background and the image collection device, a plurality of candidate positions are determined, and the shooting simulation is performed on the established 3D model at each candidate position, and the target shooting position is determined by matching the collected pictures with the set composition strategy. The above process will be described in detail below in combination with the second embodiment.

Figure 4:
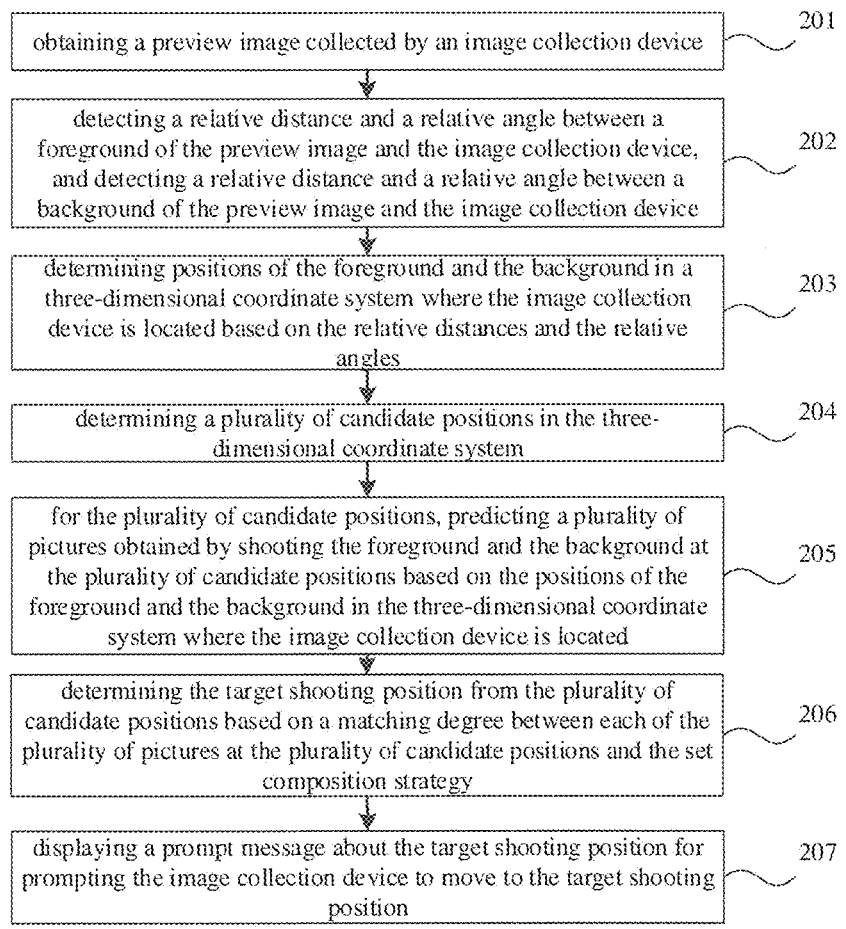
FIG. 4 is a flow chart illustrating a shooting method according to the second embodiment of the disclosure.

FIG. 4 is a flow chart illustrating a shooting method according to the second embodiment of the disclosure.

As illustrated in FIG. 4, the method may include the following blocks.

In block 201, a preview image collected by an image collection device is obtained.

In block 202, a first relative distance and a first relative angle between a foreground of the preview image and the image collection device, and a second relative distance and a second relative angle between a background of the preview image and the image collection device are detected.

The execution process of blocks 201 to 202 can refer to the execution process of blocks 101 to 102 in the above embodiments, which will not be elaborated herein.

In block 203, positions of the foreground and the background in a three-dimensional coordinate system are determined where the image collection device is located based on the first relative distance, the first relative angle, the second relative distance and the second relative angle.

In the embodiments of the disclosure, 3D modeling can be performed based on the current position of the image collection device, the first relative distance and the first relative angle between the foreground and the image collection device, the second relative distance and the second relative angle between the background and the image collection device, to determine the positions of the foreground and the background in the three-dimensional coordinate system where the image collection device is located.

For example, the image collection device may include the global positioning system (UPS). The current position of the image collection device can be determined based on the GPS information, and the 3D modeling can be performed based on the current position of the image collection device and the first relative distance and the first relative angle between each pixel in the foreground and the image collection device, to obtain the corresponding position of each pixel in the foreground in the three-dimensional coordinate system where the image collection device is located. At the same time, 3D modeling is performed based on the second relative distance and the second relative angle between each pixel in the background and the image collection device, to obtain the corresponding position of each pixel in the background in the three-dimensional coordinate system where the image collection device is located.

In block 204, a plurality of candidate positions in the three-dimensional coordinate system are determined.

In the embodiments of the disclosure, a plurality of candidate positions may be randomly selected, or selected based on a preset rule in the three-dimensional coordinate system. For example, after the 3D modeling is performed, the position of each pixel in the foreground in the three-dimensional coordinate system can be determined, so as to determine a position interval corresponding to the foreground based on the position of each pixel in the three-dimensional coordinate system. A plurality of candidate positions may be located in the position interval corresponding to the foreground, or be positions close to the foreground.

In block 205, for the plurality of candidate positions, a plurality of pictures obtained by shooting the foreground and the background at the plurality of candidate positions are predicted based on the positions of the foreground and the background in the three-dimensional coordinate system where the image collection device is located.

In the embodiments of the disclosure, after each candidate position is determined, shooting simulation can be performed on the established 3D modeling at each candidate position. Specifically, for the plurality of candidate positions, a plurality of pictures obtained by shooting the foreground and the background at the plurality of candidate positions are predicted based on the positions of the foreground and the background in the three-dimensional coordinate system where the image collection device is located.

In block 206, the target shooting position from the plurality of candidate positions is determined based on a matching degree between the composition of each of the plurality of pictures at the plurality of candidate positions and the set composition strategy.

In the embodiments of the disclosure, after a picture is obtained by shooting simulation at the plurality of candidate positions, the composition of the picture at each candidate position can be matched with the set composition strategy, to determine the matching degree between the composition of the picture at each candidate position and the set composition strategy, so that the target shooting position can be determined from the plurality of candidate positions based on each matching degree. The matching degree herein refers to a similarity value between a composition of a picture at a candidate position and a composition in the set strategy. If the matching degree is very high (i.e., the similarity value is large), the picture may have a desired composition as required in the set composition strategy.

For example, assuming that the current shooting scene is a character scene, such as a portrait scene and at this time, the set composition strategy can indicate that the area of the foreground is larger than the area of the background, it can be determined from the pictures at each candidate position whether there is a picture where the area of the foreground is larger than the area of the background. If so, the candidate position corresponding to the picture where the area of the foreground is larger than the area of the background can be regarded as the target shooting position.

It may be understood that in actual applications, the number of pictures that match with the set composition strategy may be more than one. Therefore, in order to improve the shooting effect of pictures, the candidate position corresponding to the picture with the highest matching degree can be regarded as the target shooting position.

In block 207, a prompt message about the target shooting position is displayed for prompting the image collection device to move to the target shooting position.

The execution process of block 207 can refer to the execution process of block 104 in the above embodiments, which will not be elaborated herein.

It should be noted that in actual applications, the user may move during the process of shooting pictures, such as changing scenes to take pictures, looking for shooting targets, and the like. At this time, the obtained data is not suitable for a modeling analysis. In a possible implementation of the embodiments of the disclosure, when the image collection device has a high shaking degree, it can be recognized as a non-shooting behavior without performing a modeling analysis, thereby saving computational resources. The above process will be described in detail below in combination with the third embodiment.

Figure 5:
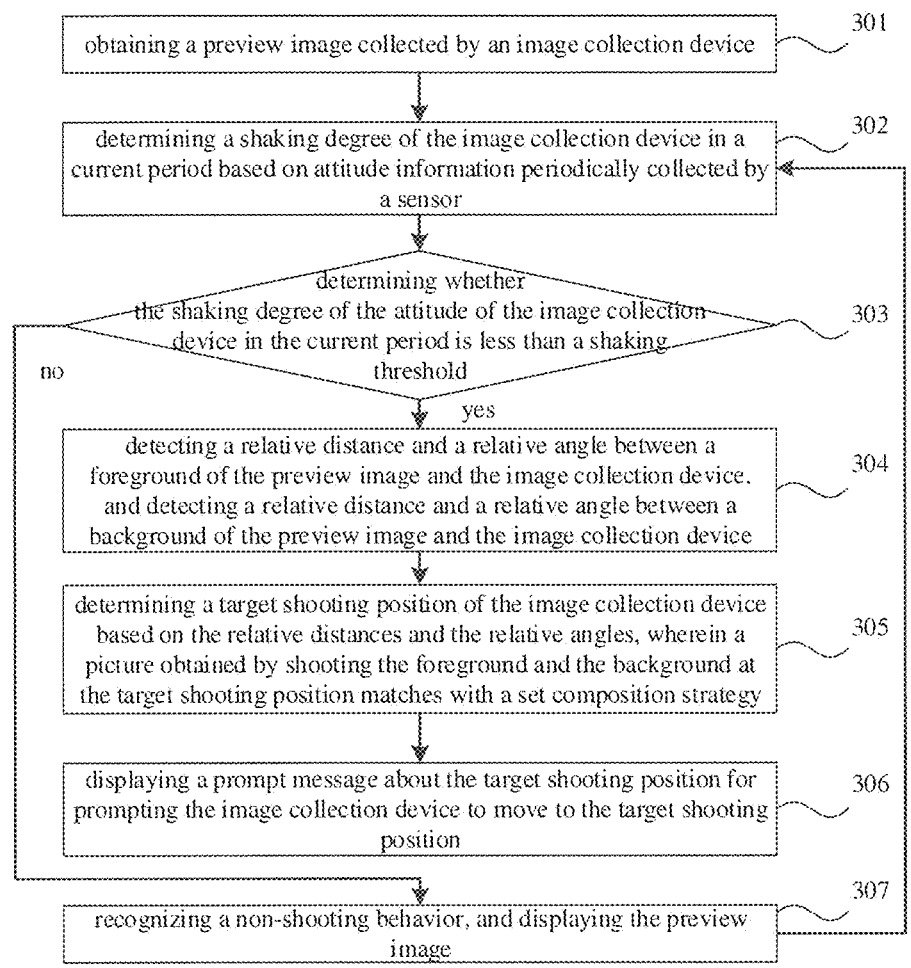
FIG. 5 is a flow chart illustrating a shooting method according to the third embodiment of the disclosure.

FIG. 5 is a flow chart illustrating a shooting method according to the third embodiment of the disclosure.

As illustrated in FIG. 5, the method may include the following blocks.

In block 301, a preview image collected by an image collection device is obtained.

The execution process of block 301 can refer to the execution process of block 101 in the above embodiments, which will not be elaborated herein.

In block 302, a shaking degree of an attitude of the image collection device in a current period is determined based on attitude information periodically collected by a sensor.

As a possible implementation, the above sensor may be a displacement sensor. The displacement information of the image collection device during the shooting process is collected by the displacement sensor, and based on the obtained displacement information, it can be determined whether the image collection device shakes and the shaking degree of the image collection device.

For example, by obtaining current gyro-sensor information in the image collection device, it is possible to determine whether the image collection device shakes and the shaking degree of the image collection device based on the gyro-sensor information.

The gyro-sensor is also called the angular velocity sensor, which can measure a physical quantity such as a rotational angular velocity when it is deflected or tilted. In the image collection device, the gyro-sensor can measure the rotation and deflection actions very well, so that the actual actions of the user can be accurately analyzed and determined. The gyro information can include movement information of the image collection device in three dimensions of the three-dimensional space. The three dimensions of the three-dimensional space can be represented by three directions, X-axis, Y-axis, and Z-axis, each two of which are in a vertical relation.

Therefore, in the embodiments of the disclosure, it is possible to determine whether the image collection device shakes and the shaking degree of the image collection device in the current period based on the gyro information in the current period. The greater the absolute value of the movement information of the image collection device in three directions is, the greater the shaking degree of the image collection device is.

In the disclosure, after the gyro information in the current period is obtained, the shaking degree of the attitude of the image collection device in the current period can be calculated based on the movement information in three directions of the gyro information in the current period. For example, the movement information in three directions of the gyro information in the current period is marked as A, B, and C, and the shaking degree of the attitude of the image collection device in the current period can be $\sqrt{A^2+B^2+C^2}$.

In block 303, it is determined whether the shaking degree of the attitude of the image collection device in the current period is less than the shaking threshold. If so, blocks 304 to 306 are executed. If not, block 307 is executed.

In the embodiments of the disclosure, the shaking threshold is preset.

In the embodiments of the disclosure, it can be determined whether the shaking degree of the attitude of the image collection device in the current period is less than the shaking threshold. When the shaking degree of the attitude of the image collection device in the current period is less than the shaking threshold, blocks 304 to 306 are executed. When the shaking degree of the attitude of the image collection device is greater than or equal to the shaking threshold, block 307 is executed.

In block 304, a first relative distance and a first relative angle between a foreground of the preview image and the image collection device, and a second relative distance and a second relative angle between a background of the preview image and the image collection device are detected.

In block 305, a target shooting position of the image collection device is determined based on the first relative distance, the first relative angle, the second relative distance and the second relative angle, in which a picture obtained by shooting the foreground and the background at the target shooting position matches with a set composition strategy.

In block 306, a prompt message about the target shooting position is displayed for prompting the image collection device to move to the target shooting position.

The execution process of blocks 304 to 306 can refer to the execution process of the above embodiments, which will not be elaborated herein.

In block 307, a non-shooting behavior is recognized, and the preview image is displayed.

In the embodiments of the disclosure, when the shaking degree of the attitude of the image collection device in the current period is greater than or equal to the shaking threshold, it indicates that the user may be in a marching process, or looking for a shooting target, or, switching the shooting scenes, for example from a portrait scene to a landscape scene. At this time, the obtained data is not suitable for a modeling analysis. Therefore, a non-shooting behavior can be recognized without performing the modeling analysis. A preview image can be collected again, and the collected preview image can be displayed. As a result, computational resources can be saved.

As possible implementation, the user can trigger the image collection device to collect a preview image by tapping the shooting control on the shooting interface. Therefore, the user can collect the preview image by pressing the existing shooting control without setting additional controls, which can improve the aesthetics of the shooting interface. The above process will be described in detail below in combination with the fourth embodiment.

Figure 6:
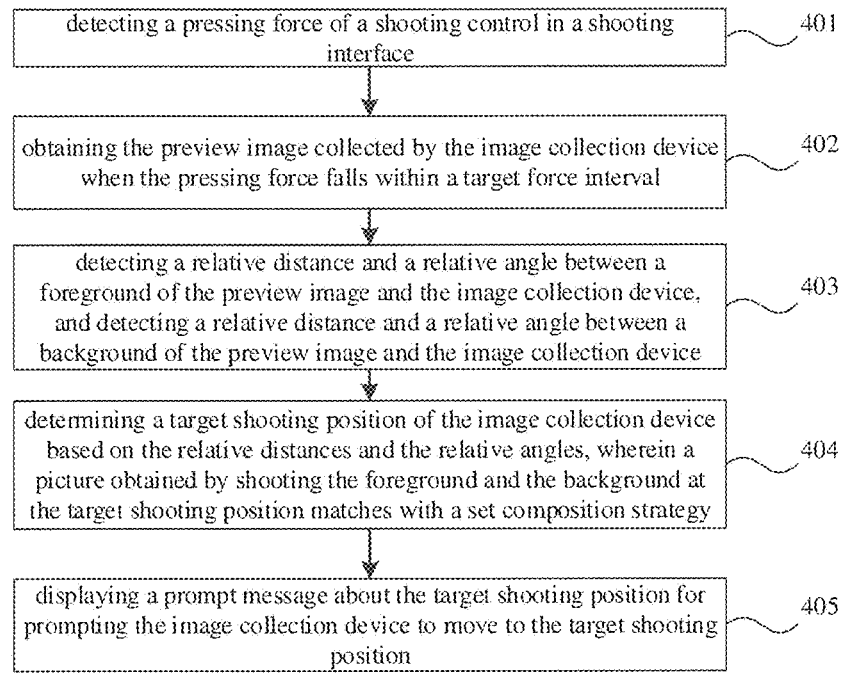
FIG. 6 is a flow chart illustrating a shooting method according to the fourth embodiment of the disclosure.

FIG. 6 is a flow chart illustrating a shooting method according to the fourth embodiment of the disclosure.

As illustrated in FIG. 6, the method may include the following blocks.

In block 401, a pressing force of a shooting control in a shooting interface collected by a pressure element is obtained.

In the embodiments of the disclosure, the shooting apparatus can detect the pressing force of the shooting control in the shooting interface. For example, a pressure element may be provided on the image collection device. The user's pressing force on the shooting control in the shooting interface can be collected by the pressure element, so that the shooting apparatus can obtain the pressing force collected by the pressure element. The pressure element can be a piezoelectric material film or a pressure sensor.

In block 402, the preview image collected by the image collection device can be obtained when the pressing force falls within a target force interval.

In the embodiments of the disclosure, the target force interval is preset, in which the target force interval is a smaller value interval.

In the embodiments of the disclosure, the preview image collected by the image collection device can be obtained when the pressing force falls within the target force interval.

In block 403, a first relative distance and a first relative angle between a foreground of the preview image and the image collection device, and a second relative distance and a second relative angle between a background of the preview image and the image collection device are detected.

In block 404, a target shooting position of the image collection device is determined based on the first relative distance, the first relative angle, the second relative distance and the second relative angle, in which a picture obtained by shooting the foreground and the background at the target shooting position matches with a set composition strategy.

In block 405, a prompt message about the target shooting position is displayed for prompting the image collection device to move to the target shooting position.

The execution process of blocks 403 to 405 can refer to the execution process of the above embodiments, which will not be elaborated herein.

Further, after the image collection device moves to the target shooting position, the image collection device can be automatically controlled to take a picture, or the user can also press the shooting control to take a picture. Specifically, when the pressing force is greater than an upper limit of the target force interval, the image collection device can be controlled to shoot. In this way, shooting can be realized based on the user' needs without continuing recommending the optimal shooting position for the user. On the one hand, it can meet the actual shooting needs of the user. On the other hand, it can also save computational resources.

In order to implement the above embodiments, the disclosure also provides a shooting apparatus.

Figure 7:
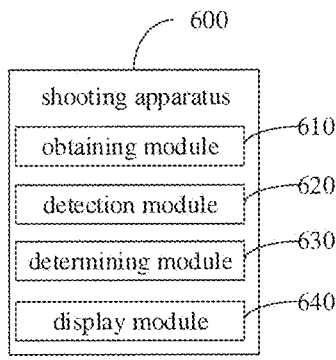
FIG. 7 is a structural schematic diagram illustrating a shooting apparatus according to the fifth embodiment of the disclosure.

FIG. 7 is a structural schematic diagram illustrating a shooting apparatus according to the fifth embodiment of the disclosure.

As shown in FIG. 7, the shooting apparatus 600 includes: an obtaining module 610, a detection module 620, a determining module 630, and a display module 640. The obtaining module 610 is configured to obtain a preview image collected by an image collection device. The detection module 620 is configured to detect a first relative distance and a first relative angle between a foreground of the preview image and the image collection device, and detect a second relative distance and a second relative angle between a background of the preview image and the image collection device. The determining module 630 is configured to determine a target shooting position of the image collection device based on the first relative distance, the first relative angle, the second relative distance and the second relative angle, in which a picture obtained by shooting the foreground and the background at the target shooting position matches with a set composition strategy. The display module 640 is configured to display a prompt message about the target shooting position for prompting the image collection device to move to the target shooting position.

As a possible implementation, the determining module 630 is specifically configured to: determine positions of the foreground and the background in a three-dimensional coordinate system where the image collection device is located based on the first relative distance, the first relative angle, the second relative distance and the second relative angle; determine a plurality of candidate positions in the three-dimensional coordinate system; for the plurality of candidate positions, predict a plurality of pictures obtained by shooting the foreground and the background at the plurality of candidate positions based on the positions of the foreground and the background in the three-dimensional coordinate system where the image collection device is located; determine the target shooting position from the plurality of candidate positions based on a matching degree between the composition of each of the plurality of pictures at the plurality of candidate positions and the set composition strategy.

As a possible implementation, the detection module 620 is specifically configured to: determine a shaking degree of an attitude of the image collection device in a current period based on attitude information periodically collected by a sensor; detect the first relative distance and the first relative angle between the foreground of the preview image and the image collection device, and detect the second relative distance and the second relative angle between the background of the preview image and the image collection device when the shaking degree of the attitude of the image collection device in the current period is less than a shaking threshold; and recognize a non-shooting behavior, and display the preview image when the shaking degree of the attitude of the image collection device in the current period is greater than or equal to the shaking threshold.

Figure 8:
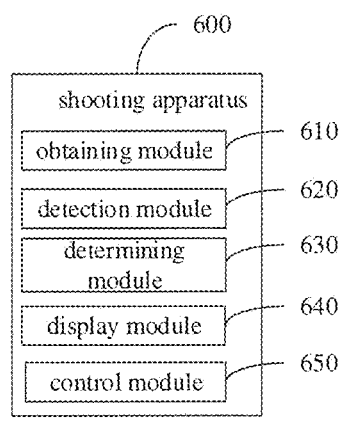
FIG. 8 is a structural schematic diagram illustrating a shooting apparatus according to the sixth embodiment of the disclosure.

Further, in a possible implementation of the embodiments of the disclosure, referring to FIG. 8, based on the embodiment illustrated in FIG. 7, the shooting apparatus 600 may further include a control module 650.

As a possible implementation, the obtaining module 610 is specifically configured to: detect a pressing force of a shooting control in a shooting interface; and obtain the preview image collected by the image collection device when the pressing force falls within a target force interval. The control module 650 is configured to control the image collection device to shoot when the pressing force is greater than an upper limit of the target force interval.

As a possible implementation, the prompt message includes at least one of a direction arrow and a rotation angle.

It should be noted that the explanation of the shooting method in the above embodiments of FIG. 1 to FIG. 6 is also applicable to the shooting apparatus of this embodiment, which will not be elaborated here.

According to the shooting apparatus in the embodiments of the disclosure, the foreground and background of the preview image collected by the image collection device are recognized, the first relative distance and the first relative angle between the foreground of the preview image and the image collection device, and the second relative distance and the second relative angle between the background of the preview image and the image collection device are detected, so that the target shooting position of the image collection device are determined based on the first relative distance, the first relative angle, the second relative distance and the second relative angle, in which the picture obtained by shooting the foreground and background at the target shooting position matches with the set composition strategy, and the prompt message of the target shooting position is displayed for prompting the image collection device to move to the target shooting position. Therefore, when the user takes a picture, the optimal shooting position can be automatically calculated for the user, which is recorded as the target shooting position in the disclosure, and the target shooting position is prompted, so that the user can move the image collection device to the target shooting position based on the prompt message for taking pictures. On the one hand, the imaging effect can be improved. On the other hand, there is no need for the user to repeatedly shoot and filter pictures, and there is no need for the user to post-process pictures, which may improve the user experience.

According to the embodiments of the disclosure, the disclosure also provides an electronic device and a readable-storage medium.

Figure 9:
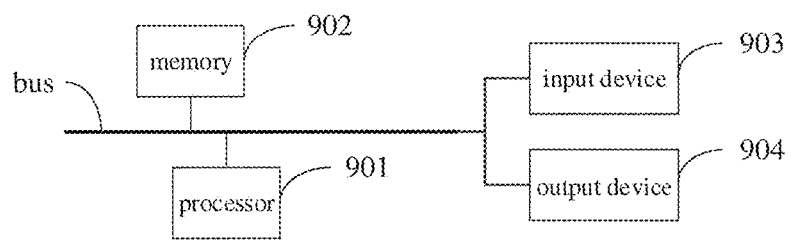
FIG. 9 is a block diagram illustrating an electronic device for implementing the shooting method in the embodiments of the disclosure.

FIG. 9 is a block diagram illustrating an electronic device of the shooting method according to an exemplary embodiment. Electronic devices are intended to represent various forms of digital computers, such as laptop computers, desktop computers, work tables, personal digital assistants, servers, blade servers, mainframe computers, and other suitable computers. Electronic devices can also represent various forms of mobile devices, such as personal digital processors, cellular phones, smart phones, wearable devices, and other similar computing devices. The components illustrated herein, their connections and relationships, and their functions are merely examples, and are not intended to limit the implementation of the disclosure described and/or required herein.

As illustrated in FIG. 9, the electronic device includes one or more processors 901, a memory 902, and interfaces for connecting various components, including high-speed interfaces and low-speed interfaces. The various components are connected to each other via different buses, and can be installed on a common motherboard or installed in other ways as needed. The processor may process instructions executed in the electronic device, including instructions stored in or on the memory to display graphical information of the GUI on an external input/output device (such as a display device coupled to an interface). In other embodiments, when necessary, a plurality of processors and/or a plurality of buses can be used with a plurality of memories and a plurality of storages. Similarly, a plurality of electronic devices can be connected, and each device provides some necessary operations (for example, as a server array, a group of blade servers, or a multi-processor system). In FIG. 9, a processor 901 is taken as an example.

The memory 902 is a non-transitory computer-readable storage medium according to the disclosure. The memory is configured to store instructions executable by at least one processor, so that at least one processor implements the shooting method according to the disclosure. The non-transitory computer-readable storage medium of the disclosure has computer instructions stored thereon, in which the computer instructions are configured to cause a computer to execute the shooting method according to the disclosure.

As a non-transitory computer-readable storage medium, the memory 902 can be used to store non-transitory software programs, non-transitory computer-executable programs and modules, such as program instructions/modules corresponding to the shooting method in the embodiments of the disclosure (for example, the obtaining module 610, the detection module 620, the determining module 630, and the display module 640 illustrated in FIG. 7). The processor 901 implements various functional applications and data processing of the server, that is, implements the shooting method in the above method embodiments, by running the non-transitory software programs, instructions, and modules stored in the memory 902.

The memory 902 may include a storage program area and a storage data area, in which the storage program area may store an operating system and an application program required by at least one function; the storage data area may store data created by using the electronic device of the shooting method, in addition, the memory 902 may include a high-speed random access memory, and may also include a non-transitory memory, such as at least one magnetic disk storage device, a flash memory device, or other non-transitory solid-state storage devices. In some embodiments, the memory 902 optionally includes remote memories provided with respect to the processor 901, and these remote memories may be connected to the electronic device. Examples of the above networks include, but are not limited to, the Internet, a corporate Intranet, a local area network, a mobile communication network, and combinations thereof.

The electronic device may further include: an input device 903 and an output device 904. The processor 901, the memory 902, the input device 903, and the output device 904 may be connected via a bus or other methods. In FIG. 9, the connection via the bus is taken as an example.

The input device 903 can receive input digital or character information, and generate key signal inputs related to the user settings and function control of the electronic device, such as touch screens, keypads, mouses, trackpads, touchpads, indicating arms, one or more mouse buttons, trackballs, joysticks and other input device. The output device 904 may include a display device, an auxiliary lighting device (for example, LED), a tactile feedback device (for example, a vibration motor), and the like. The display device may include, but is not limited to, a liquid crystal display (LCD), a light emitting diode (LED) display; and a plasma display. In some embodiments, the display device may be a touch screen.

Various implementations of the systems and technologies described herein can be implemented in digital electronic circuit systems, integrated circuit systems, specific application-specific integrated circuit (ASIC), computer hardware, firmware, software, and/or combinations thereof. These various embodiments may be implemented in one or more computer programs, which may be executed and/or interpreted on a programmable system including at least one programmable processor. The programmable processor may be a dedicated or general purpose programmable processor that can receive data and instructions from the storage system, at least one input device, and at least one output device, and transmit the data and instructions to the storage system, at least one input device, and at least one output device.

These computational procedures (also called programs, software, software applications, or codes) include machine instructions of a programmable processor, and can be implemented using high-level procedures and/or object-oriented programming languages, and/or assembly/machine language to implement computational procedures. As used herein, the terms "machine-readable medium" and "computer-readable medium" refer to any computer program product, device, and/or apparatus used to provide machine instructions and/or data to the programmable processor (for example, magnetic disks, optical disks, memories, programmable logic devices (PLD)), including machine-readable media that receive machine instructions as machine-readable signals. The term "machine-readable signal" refers to any signal used to provide machine instructions and/or data to the programmable processor.

In order to provide interactions with the user, the systems and technologies described herein can be implemented on a computer and the computer includes a display device for displaying information to the user (for example, a CRT (cathode ray tube) or an LCD (liquid crystal display) monitor)); and a keyboard and a pointing device (for example, a mouse or a trackball) through which the user can provide inputs to the computer. Other types of devices can also be used to provide interactions with the user; for example, the feedback provided to the user can be any form of sensory feedback (for example, visual feedback, auditory feedback, or tactile feedback); and can be in any form (including an acoustic input, a voice input, or a tactile input) to receive inputs from the user.

The systems and technologies described herein can be implemented in a computing system that includes back-end components (for example, as a data server), or a computing system that includes middleware components (for example, an application server), or a computing system that includes front-end components (for example, a user computer with a graphical user interface or web browser through which the user can interact with the implementation of the systems and technologies described herein), or a computing system that includes any combination of the back-end components, middleware components, or front-end components. The components of the system can be connected to each other through any form or medium of digital data communication (for example, a communication network). Examples of communication networks include: local area networks (LAN), wide area networks (WAN), and the Internet.

The computer system may include a client and a server. The client and server are generally far away from each other and usually interact through a communication network. The relationship between the client and the server is generated by computer programs that run on the corresponding computer and have a client-server relationship with each other. The server can be a cloud server, also known as a cloud computing server or a cloud host, which is a host product in the cloud computing service system to solve the problem of difficult management and weak business scalability of traditional physical hosts and VPS services.

According to the technical solution of the embodiments of the disclosure, the foreground and background of the preview image collected by the image collection device are recognized, the first relative distance and the first relative angle between the foreground of the preview image and the image collection device, and the second relative distance and the second relative angle between the background of the preview image and the image collection device are detected, so that the target shooting position of the image collection device is determined based on the first relative distance, the first relative angle, the second relative distance and the second relative angle, in which the picture obtained by shooting the foreground and background at the target shooting position matches with the set composition strategy, and the prompt message of the target shooting position is displayed for prompting the image collection device to move to the target shooting position. Therefore, when the user takes a picture, the optimal shooting position can be automatically calculated for the user, which is recorded as the target shooting position in the disclosure, and the target shooting position is prompted, so that the user can move the image collection device to shoot at the target shooting position based on the prompt message. On the one hand, the imaging effect can be improved. On the other hand, there is no need for the user to repeatedly shoot and filter pictures, and there is no need for the user to post-process pictures, which may improve the user experience.

It may be understood that the various forms of processes illustrated above can be used to reorder, add or delete steps. For example, the steps described in the disclosure can be executed in parallel, sequentially, or in a different order, as long as the desired result of the technical solution disclosed in the disclosure can be achieved, which is not limited herein.

The above specific implementations do not constitute a limitation on the protection scope of the disclosure. Those skilled in the art should understand that various modifications, combinations, sub-combinations and substitutions can be made based on design requirements and other factors. Any modification, equivalent replacement and improvement made within the spirit and principle of the disclosure shall be included in the protection scope of the disclosure.

What is claimed is:

1. A shooting method, comprising:
    obtaining a preview image collected by an image collection device;
    detecting a first relative distance and a first relative angle between a foreground of the preview image and the image collection device, and detecting a second relative distance and a second relative angle between a background of the preview image and the image collection device;
    determining a target shooting position of the image collection device based on the first relative distance, the first relative angle, the second relative distance and the second relative angle, wherein a picture obtained by shooting the foreground and the background at the target shooting position has a composition that matches with a set composition strategy, and the set composition strategy includes a composition about a relative position of the foreground to the background and a relative area of the foreground to the background; and
    displaying a prompt message about the target shooting position for prompting the image collection device to move to the target shooting position.

2. The shooting method of claim 1, wherein determining the target shooting position of the image collection device comprises:
    determining positions of the foreground and the background in a three-dimensional coordinate system where the image collection device is located based on the first relative distance, the first relative angle, the second relative distance and the second relative angles;
    determining a plurality of candidate positions in the three-dimensional coordinate system;
    for the plurality of candidate positions, predicting a plurality of pictures obtained by shooting the foreground and the background at the plurality of candidate positions based on the positions of the foreground and the background in the three-dimensional coordinate system; and
    determining the target shooting position from the plurality of candidate positions based on a matching degree between the composition of each of the plurality of pictures at the plurality of candidate positions and the set composition strategy.

3. The shooting method of claim 1, wherein detecting the first relative distance, the first relative angle, the second relative distance and the second relative angle comprises:
    determining a shaking degree of an attitude of the image collection device in a current period based on attitude information periodically collected by a sensor;
    detecting the first relative distance, the first relative angle, the second relative distance and the second relative angle when the shaking degree of the attitude of the image collection device in the current period is less than a shaking threshold; and
    recognizing a non-shooting behavior, and displaying the preview image when the shaking degree of the attitude of the image collection device in the current period is greater than or equal to the shaking threshold.

4. The shooting method of claim 1, wherein obtaining the preview image collected by the image collection device comprises:
    obtaining a pressing force of a shooting control in a shooting interface collected by a pressure element; and
    obtaining the preview image collected by the image collection device when the pressing force falls within a target force interval.

5. The shooting method of claim 4, wherein after detecting the pressing force of the shooting control in the shooting interface, the method further comprises: controlling the image collection device to shoot when the pressing force is greater than an upper limit of the target force interval.

6. The shooting method of claim 1, wherein the prompt message comprises at least one of a direction arrow and a rotation angle.

7. A shooting apparatus, comprising:
one or more processors; and
a memory storing instructions executable by the one or more processors;
wherein the one or more processors are configured to:
obtain a preview image collected by an image collection device;
detect a first relative distance and a first relative angle between a foreground of the preview image and the image collection device, and detect a second relative distance and a second relative angle between a background of the preview image and the image collection device;
determine a target shooting position of the image collection device based on the first relative distance, first relative angle, the second relative distances and the relative angles, wherein a picture obtained by shooting the foreground and the background at the target shooting position has a composition that matches with a set composition strategy and the set composition strategy includes a composition about a relative position of the foreground to the background and a relative area of the foreground to the background; and
display a prompt message about the target shooting position for prompting the image collection device to move to the target shooting position.

8. The shooting apparatus of claim 7, wherein the one or more processors are further configured to:
determine positions of the foreground and the background in a three-dimensional coordinate system where the image collection device is located based on the first relative distances, the first relative angle, the second relative distance and the second relative angle;
determine a plurality of candidate positions in the three-dimensional coordinate system;
for the plurality of candidate positions, predict a plurality of pictures obtained by shooting the foreground and the background at the plurality of candidate positions based on the positions of the foreground and the background in the three-dimensional coordinate system; and
determine the target shooting position from the plurality of candidate positions based on a matching degree between the composition of each of the plurality of pictures at the plurality of candidate positions and the set composition strategy.

9. The shooting apparatus of claim 7, wherein the one or more processors are further configured to:
determine a shaking degree of an attitude of the image collection device in a current period based on the attitude information periodically collected by the sensor;
detect the first relative distance and the first relative angle between the foreground of the preview image and the image collection device, and detect the second relative distance and the second relative angle between the background of the preview image and the image collection device when the shaking degree of the attitude of the image collection device in the current period is less than a shaking threshold; and
recognize a non-shooting behavior, and display the preview image when the shaking degree of the attitude of the image collection device in the current period is greater than or equal to the shaking threshold.

10. The shooting apparatus of claim 7, wherein the one or more processors are further configured to:
obtain a pressing force of a shooting control in a shooting interface collected by a pressure element; and
obtain the preview image collected by the image collection device when the pressing force falls within a target force interval.

11. The shooting apparatus of claim 10, wherein the one or more processors are further configured to:
control the image collection device to shoot when the pressing force is greater than an upper limit of the target force interval.

12. The shooting apparatus of claim 7, wherein the prompt message comprises at least one of a direction arrow and a rotation angle.

13. An electronic device, comprising:
a first camera configured to collect a preview image, and a second camera configured to synchronously collect a depth map of the preview image;
a sensor configured to periodically collect attitude information of the first camera;
a pressure element configured to collect a pressing force of a shooting control in a shooting interface; and
a processor configured to
determine a first relative distance and a first relative angle between a foreground of the preview image and the first camera, and a second relative distance and a second relative angle between a background of the preview image and the first camera based on the depth map of the preview image;
determine a target shooting position of the image collection device based on the first relative distance, the first relative angle, the second relative distance and the second relative angle, wherein a picture obtained by shooting the foreground and the background at the target shooting position has a composition that matches with a set composition strategy, and the set composition strategy includes a composition about a relative position of the foreground to the background and a relative area of the foreground to the background; and
generate a prompt message about the target shooting position for prompting the image collection device to move to the target shooting position.

14. The electronic device of claim 13, wherein the processor is further configured to:
determine positions of the foreground and the background in a three-dimensional coordinate system where the first camera is located based on the first relative distance, the first relative angle, the second relative distance and the second relative angle;
determine a plurality of candidate positions in the three-dimensional coordinate system;
for the plurality of candidate positions, predict a plurality of pictures obtained by shooting the foreground and the background at the plurality of candidate positions based on the positions of the foreground and the background in the three-dimensional coordinate system; and
determine the target shooting position from the plurality of candidate positions based on a matching degree between the composition of each of the plurality of pictures at the plurality of candidate positions and the set composition strategy.

15. The electronic device of claim 13, wherein the processor is further configured to:
- determine a shaking degree of an attitude of the first camera in a current period based on the attitude information;
- determine the first relative distance and the first relative angle between the foreground of the preview image and the first camera, and the second relative distance and the second relative angle between the background of the preview image and the first camera when the shaking degree of the attitude of the first camera in the current period is less than a shaking threshold; and
- recognize a non-shooting behavior and control to display the preview image when the shaking degree of the attitude of the image collection device in the current period is greater than or equal to the shaking threshold.

16. The electronic device of claim 13, wherein the processor is configured to obtain the preview image when the pressing force falls within a target force interval.

17. The electronic device of claim 16, wherein the processor is configured to control the first camera to shoot when the pressing force is greater than an upper limit of the target force interval.

18. The electronic device of claim 14, wherein the processor is configured to:
- perform a 3D modeling based on a current position of the first camera, the first relative distance and the first relative angle, to obtain positions of the foreground in the three-dimensional coordinate system;
- perform a 3D modeling on a current position of the first camera, the second relative distance and the second relative angle, to obtain positions of the background in the three-dimensional coordinate system; and
- perform a simulation shooting at the plurality of candidate positions to obtain the predicted plurality of pictures based on the positions of the foreground and the background in the three-dimensional coordinate system.

* * * * *